United States Patent
Wendel et al.

(10) Patent No.: US 9,400,708 B2
(45) Date of Patent: Jul. 26, 2016

(54) INTEGRATED CIRCUIT AND METHOD OF DETECTING A DATA INTEGRITY ERROR

(71) Applicants: Dirk Wendel, Grasbrunn (DE); Michael Rohleder, Unterschleissheim (DE); Rolf Schlagenhaft, Poing (DE)

(72) Inventors: Dirk Wendel, Grasbrunn (DE); Michael Rohleder, Unterschleissheim (DE); Rolf Schlagenhaft, Poing (DE)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 166 days.

(21) Appl. No.: 14/483,262

(22) Filed: Sep. 11, 2014

(65) Prior Publication Data
US 2016/0077904 A1   Mar. 17, 2016

(51) Int. Cl.
*G06F 11/00* (2006.01)
*G06F 11/07* (2006.01)

(52) U.S. Cl.
CPC .......... *G06F 11/079* (2013.01); *G06F 11/0736* (2013.01); *G06F 11/0751* (2013.01); *G06F 11/0772* (2013.01)

(58) Field of Classification Search
CPC ............ G06F 11/0736; G06F 11/0751; G06F 11/0772; G06F 11/079
USPC ............................................................ 714/15
See application file for complete search history.

(56) References Cited

U.S. PATENT DOCUMENTS

| | | | |
|---|---|---|---|
| 6,975,238 B2 | 12/2005 | Schneider | |
| 8,782,434 B1 * | 7/2014 | Ghose | G06F 9/3851 711/118 |
| 2009/0112790 A1 * | 4/2009 | Hama | G06F 11/0751 |
| 2012/0173924 A1 | 7/2012 | Xiao et al. | |
| 2013/0007531 A1 * | 1/2013 | Jibbe | G06F 11/1004 714/42 |

* cited by examiner

*Primary Examiner* — David Ton

(57) ABSTRACT

An integrated circuit comprises a write bus coupled to a register for storing control data. A storage unit is arranged to store reference signature data encoding a reference collective state of the register. First logic circuitry generates actual signature data encoding the actual collective state of the register. Second logic circuitry is coupled to the storage unit, receives the actual signature data and compares the actual signature data with the reference signature data. The second logic circuitry comprises an alert output to provide an alert signal in response to the comparison identifying a difference between the actual signature data and the reference signature data, thereby ensuring detection of a data integrity error in respect of the register. An alert inhibitor comprises a control input and is responsive to the control input and arranged to inhibit selectively onward propagation of the alert signal from the alert output.

18 Claims, 7 Drawing Sheets

INTEGRATED CIRCUIT AND METHOD OF DETECTING A DATA INTEGRITY ERROR

FIELD OF THE INVENTION

This invention relates to an integrated circuit and a method of detecting a data integrity error.

BACKGROUND OF THE INVENTION

For applications that need to comply with safety standards, the prevention and detection of errors is an important concern. For many of these applications, semiconductor devices, for example Microcontroller Units (MCUs) and sensors, are used. Most semiconductor devices possess configuration or control registers, which are often holding critical information for the correct functionality of such devices.

For a given application, incorrect setting of these registers can have a severe impact upon safety and so it is important to ensure that the settings of the configuration registers are accurate. Often, the configuration registers are initialised once by a Central Processing Unit (CPU) or an MCU, for example during a setup phase, and thereafter the practical application is reliant upon the integrity of the configuration registers. For some applications, the configuration registers within an MCU may be initially programmed by the CPU. For other applications, configuration registers of, for example, a sensor can be programmed by an MCU.

However, the configuration registers are sometimes at risk of being unintentionally programmed by software and so known measures can be employed to prevent such unintentional programming. For example, it is known to protect configuration registers by register locking or use of a Memory Protection Unit (MPU). Whilst a degree of protection can be enjoyed by the configuration registers, such measures do not protect the configuration registers against so-called soft errors, which may be caused by unintentional environmental influences like alpha-particles, neutron, electromagnetic interference or electrical signal noise. A soft error may lead to the information stored by a configuration register changing.

One known prevention measure is implemented where a configurable module is used by, for example, an Automotive Safety Integrity Level (ASIL) application. A cyclic Redundancy Check (CRC) checksum of the configuration registers of the configurable module is calculated in software and compared at least once with an expected CRC value every Fault Tolerant Time Interval (FTTI) in order to verify whether configuration of the configurable module is correct. However, while this prevention measure incurs no overhead in hardware, a significant amount of software overhead is incurred in terms of creation of the software, consumption of CPU capacity and/or bus bandwidth. Additionally, the detection of an unintentional change to one or more of the configuration registers can be late with respect to when the change occurred. Additionally or alternatively, an unintentional change to one or more of the configuration registers can lead to an encumbrance that prevents detection or reaction to errors. As a result of these problems, the value modified unintentionally may be used by, for example, the configurable module and thus may cause further errors and the possibility of deploying countermeasures becomes limited.

Another known prevention measure is the use of Triple-Voting Flip-flops (TVFs) to protect certain configuration registers identified as critical to operation. Sometimes, it is known for remaining configuration registers to be protected by the CRC-based technique described above. However, a significant hardware overhead is incurred by implementing the TVFs in respect of the critical configuration registers and a significant software overhead is incurred to protect the less-critical configuration registers.

In relation to the detection of soft errors, U.S. Pat. No. 6,975,238 relates to a circuit for detecting such errors, e.g. those caused by cosmic radiation, occurring in so-called concatenated latches. A circuit is described that generates and stores a parity bit for a number of latches, each comprising a fuse. However, such a circuit is inflexible, because it cannot address intentional changes of states of data that require supervision, and the circuit is single event use in nature and so once a configuration change is necessary the circuit requires replacement.

SUMMARY OF THE INVENTION

The present invention provides an integrated circuit and a method of detecting a data integrity error as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
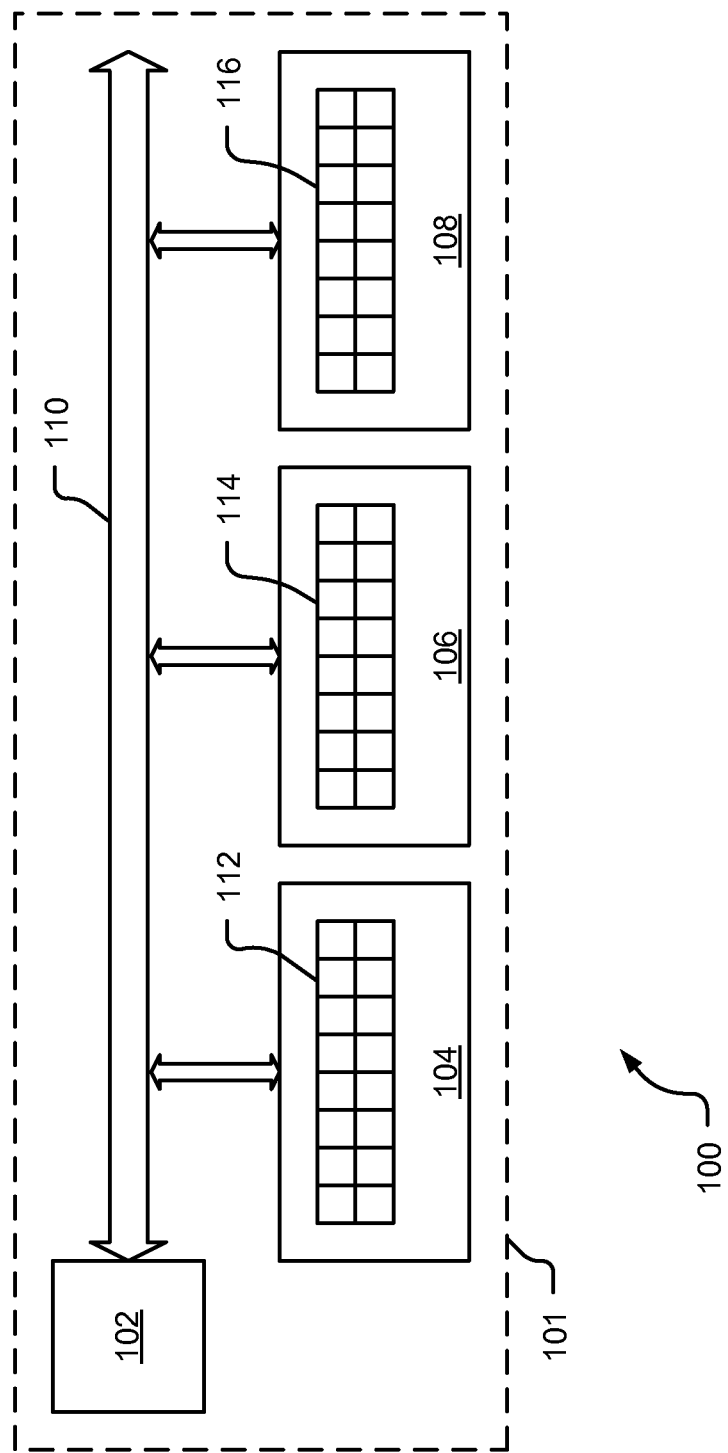
FIG. 1 is a schematic diagram of an example of an integrated circuit.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

According to a first example, there is provided an integrated circuit comprising: a write bus operably coupled to a register for storing control data; a storage unit arranged to store reference signature data encoding a reference collective state of the register; first logic circuitry arranged to generate actual signature data encoding the actual collective state of the register; second logic circuitry operably coupled to the storage unit and arranged to receive the actual signature data and compare the actual signature data with the reference signature data stored by the storage unit; and an alert inhibitor; wherein the second logic circuitry comprises an alert output at which to provide an alert signal in response to the comparison identifying a difference between the actual signature data and the reference signature data, thereby ensuring detection of a data integrity error in respect of the register; and the alert inhibitor comprises a control input, the alert inhibitor being responsive to the control input and arranged to inhibit selectively onward propagation of the alert signal from the alert output.

The circuit may further comprise third logic circuitry hardwired to encode the reference signature data in response to and based upon a number of data bits to be written to the register.

The write bus may comprise a plurality of data lines respectively coupled at one end thereof to bits of the register; and the third logic circuitry may be operably coupled to the plurality of data lines in order to receive the data bits to be written to the register.

The first logic circuitry may be hardwired to encode the actual signature data using data bits stored in the register.

The first logic circuitry may be operably coupled to the storage unit arranged to generate the reference signature data using a number of the data bits stored in the register; the reference signature data generated by the first logic circuitry may be stored by the storage unit in response to writing the control data to the register.

The third logic circuitry may be arranged to generate the reference signature data prior to generation of the actual signature data.

The first logic circuitry may be arranged to encode the actual signature data in accordance with an error detection coding scheme.

The first logic circuitry may be arranged to encode the actual signature data in accordance with a bit parity error detection scheme.

The third logic circuitry may be arranged to encode the reference signature data in accordance with a same error detection coding scheme as employed by the first logic circuitry.

The second logic circuitry may be triggered by a change to the received actual signature data.

The circuit may further comprise a monitoring unit operably coupled to the alert output; wherein the monitoring unit may be arranged to initiate an action in response to detection of the alert signal.

The action may be a reprogramming of the register or issuance of a reset command.

The storage unit may comprise reset logic circuitry arranged to set the storage unit to store a predetermined reset value in response to receipt of a reset command; the predetermined reset value may be dependent upon a reset state of the register.

The storage unit may be arranged to be updated with updated reference signature data in response to detection of a write access to the register.

The write access may be detected by the first logic circuitry; the first logic circuitry may be arranged to update the content of the storage unit with updated reference signature data in response to the detection of the write access.

The write access may be detected by the third logic circuitry; the third logic circuitry may be arranged to update the content of the storage unit with updated reference signature data in response to the detection of the write access.

The register may comprise a volatile bit, and the first logic circuitry is arranged to exclude the value of the volatile bit when generating the actual signature data.

The first logic circuitry may be arranged to exclude the value of the volatile bit by temporally suspending calculating the actual signature data.

The second logic circuitry may continuously compare the actual signature data with the reference signature data stored by the storage unit.

According to a second example, there is provided a method of detecting a data integrity error in respect of a register in an integrated circuit coupled to a write bus, the method comprising: encoding a reference collective state of the register as reference signature data and storing the reference signature data; generating actual signature data encoding the actual collective state of the register; comparing the actual signature data with the reference signature data stored by the storage unit; generating an alert signal in response to the comparison identifying a difference between the actual signature data and the reference signature data, thereby ensuring detection of a data integrity error in respect of the register; and selectively inhibiting onward propagation of the alert signal in response to a control input signal for inhibiting use of the alert signal.

It is thus possible to provide an integrated circuit and method of detecting a data integrity error that does not require frequent software monitoring of registers and hence monitors integrity of the one or more configuration registers without the need for a considerable software overhead. Similarly, there is no need for triple-voting flip-flops in order to monitor the integrity of a configuration register. The integrated circuit is simple in design and so an efficient implementation, which through the ability to monitor continuously the configuration register(s), is able to provide rapid error detection, which is not delayed by any software scheduling. Due to the simplicity of the design of the integrated circuit and hence the need for a relatively small number of logic gates, the power consumption of the integrated circuit is reduced as compared with other circuits to monitor the integrity of one or more configuration registers. Additionally, an error occurring during the programming of a configuration registers is also detectable. Even when consecutive "bit flip" errors occur, due to the speed of operation of the logic gates, errors can be detected.

The integrated circuit is agnostic to the number of bits from which one or more configuration registers is formed. As such, the number of bits of the plurality of configuration registers does not need to be an even number or a power of two for an error to be detectable. Furthermore, where the configuration register(s) comprises one or more volatile bits, e.g., bits that can be modified by hardware, these do not impact upon the monitoring of the integrity of the configuration register(s) as they can be excluded from the encoding calculation mentioned above. Additionally, the circuit can be repeatedly used without replacement as it does not contain any components intended to change state irreversibly. Of course, the above advantages are examples, and these or other advantages may be achieved by the examples set forth herein. Further, the skilled person will appreciate that not all advantages stated above are necessarily achieved by embodiments described herein.

FIG. 1 shows a first example of an integrated circuit 100 used for safety applications, for example in a vehicle, such as an automobile, although usage in other fields, which may or may not include vehicles is contemplated, for example aeronautics, railways, industrial control, and/or medical equipment, particularly where safety is of paramount concern. The integrated circuit 100 may be any kind of suitable integrated circuit that has a resource that uses one or more registers to store control data. For example, a first hardware functional unit and a second hardware functional unit may both use the one or more registers to store control data associated with interaction between the first and second hardware functional units, such as where the first hardware functional unit controls operation of the second hardware functional unit, or vice versa. In this particular example, a microcontroller unit (MCU) 101 comprising a Central Processing Unit (CPU) 102 is operably coupled to a first configurable module 104, a second configurable module 106 and a third configurable module 108 via a programming bus 110. The first, second and third configurable modules 104, 106, 108 comprise a first set of control registers 112, a second set of control registers 114 and a third set of control registers 116, respectively. The first, second and third configurable modules 104, 106, 108 may be any suitable functional unit, for example an analogue to digital converter, a communication block employing one or more communication standards, such as LIN, CAN, FlexRay, I2C, and/or Ethernet, or a functional hardware unit comprising counters and timers, an oscillator, a watchdog timer, or a memory protection unit. These examples are in no way intended to be a limiting recitation of the possible hardware functional units to which the embodiments set forth herein can be applied.

Figure 2:
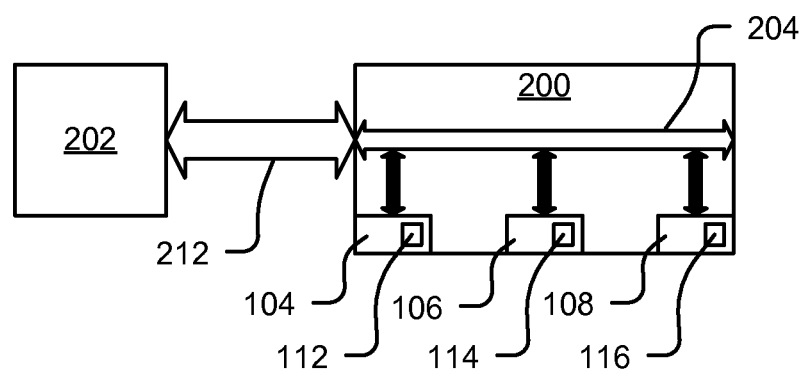
FIG. 2 is a schematic diagram of another example employing two integrated circuits.

Referring to FIG. 2, in a different architecture, a configurable device 200, for example a sensor, may comprise an internal programming bus 204 operably coupled to at least a first configurable module 104, a second configurable module 106 and a third configurable module 108, respectively comprising the first set of control registers 112, the second set of control registers 114 and the third set of control registers 116. The configurable device 200 may be operably coupled to the MCU 202, which in this example may be external to the configurable device 200, via another programming bus 212. It should be appreciated that the above examples are independent of the size of the control register and the control register can therefore be a single bit in size or many bits in size.

It should be appreciated that the above two configurations are simply examples of possible integrated circuits relying upon control registers, which are accessible by both a processing unit and the respective configurable modules. For either of these configurations (and others), the first, second and/or third configurable modules 104, 106, 108 may comprise protection logic.

Figure 3:
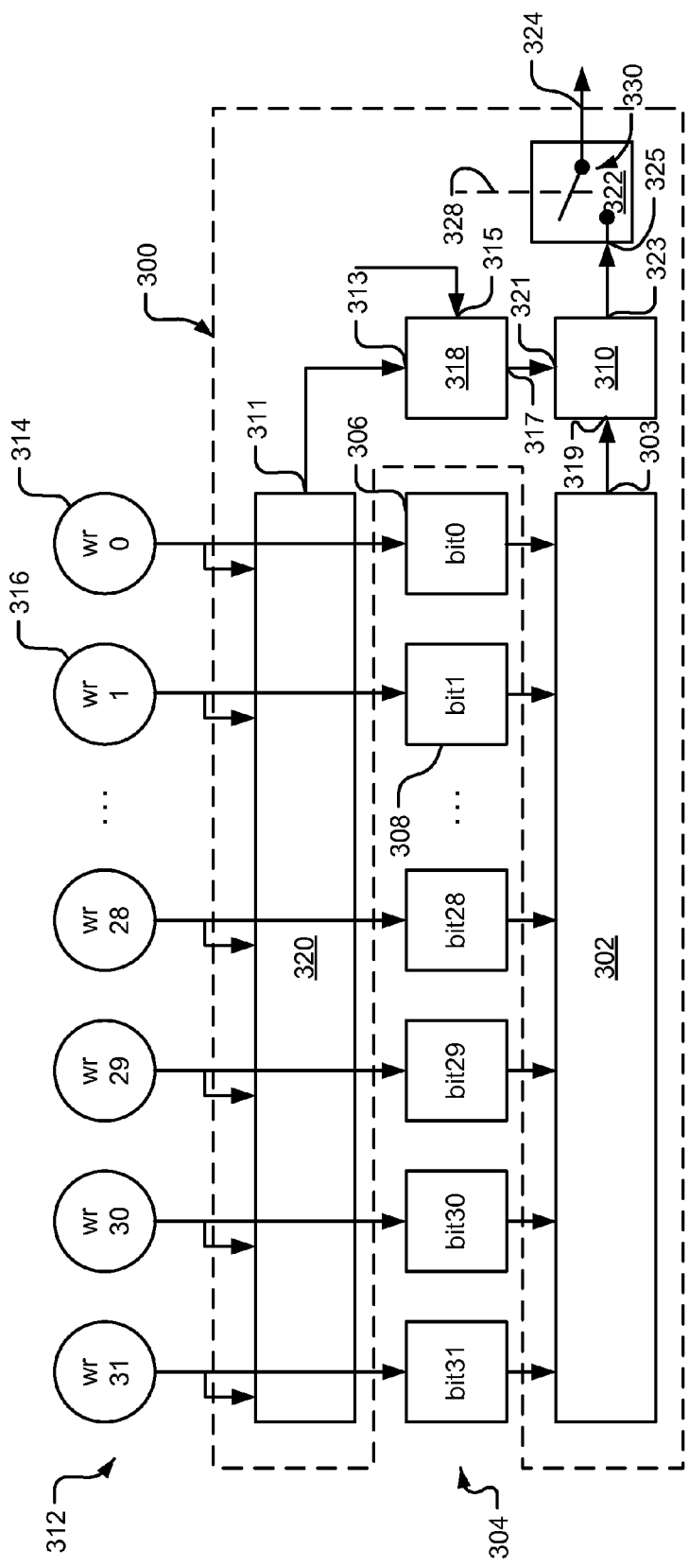
FIG. 3 is a schematic diagram of an example of a part of the integrated circuit(s) of FIG. 1 or FIG. 2 in greater detail and constituting an embodiment of the invention.

Turning to FIG. 3, the protection logic 300 may comprise first logic circuitry 302 operably coupled to one or more bit stores or flip-flops of a control register 304 of the first set of control registers 112, for example a first flip-flop 306 and a second flip-flop 308. Of course, the control register 304 is an example of just one control register and the configurable module can comprise more than one control register requiring supervision as described above in relation to FIGS. 1 and 2. It should also be appreciated that the control register 304 does not form part of the protection logic 300. A first logic circuiting output 303 of the first logic circuitry 302 may be coupled to a first input 319 of second logic circuitry 310.

The programming bus (not shown in FIG. 3) may comprise, in this example, a plurality of write lines 312, respectively coupled to the bit stores of the control register 304, for example a first programming line 314 operably coupled to the first flip-flop 306 and a second programming line 316 operably coupled to the second flip-flop 308. The plurality of write lines 312 are also each operably coupled to third logic circuitry 320; the third logic circuitry 320 may also comprise a third logic circuitry output 311 operably coupled to a first input 313 of a storage unit 318 for storing reference signature data encoding a reference collective state of the control register 304. The storage unit 318 also comprises an update input 315, which may be operably coupled to, for example, reset logic (not shown) in order to obtain a hardware-coded reset value when required. A second input 321 of the second logic circuitry 310 may be operably coupled to an output 317 of the storage unit 318. An output 323 of the second logic circuitry 310 may also be operably coupled to a first input 325 of alert output logic 322 for providing an alert signal at an alert signal output 324. The alert output logic 322 may also comprise a check enable input 328 operably coupled to switching logic 330. The alert output logic 322 is an example of a monitoring unit arranged to initiate an action, the details of which will be described later herein. However, the skilled person should appreciate that the alert output logic 322 can be implemented in a number of different ways in order to obtain a common functional objective, namely to decouple the output 323 of the second logic circuitry 310 from subsequent circuitry (not shown) provided to respond to an alert signal. This can be achieved, for example using one or more logic gates or a multiplexer.

The first, second and third logic circuitry 302, 310, 320 may comprise combinatorial logic circuits in order to support functionality, which will be described later herein. The first, second and/or third logic circuitry 302, 310, 320 may be hardwired or formed from reprogrammable logic circuitry. However, the reconfigurable logic circuitry may not be reprogrammed on-the-fly, i.e. when in operation. It is important to note this logic is implemented in hardware as opposed to software.

Figure 4:
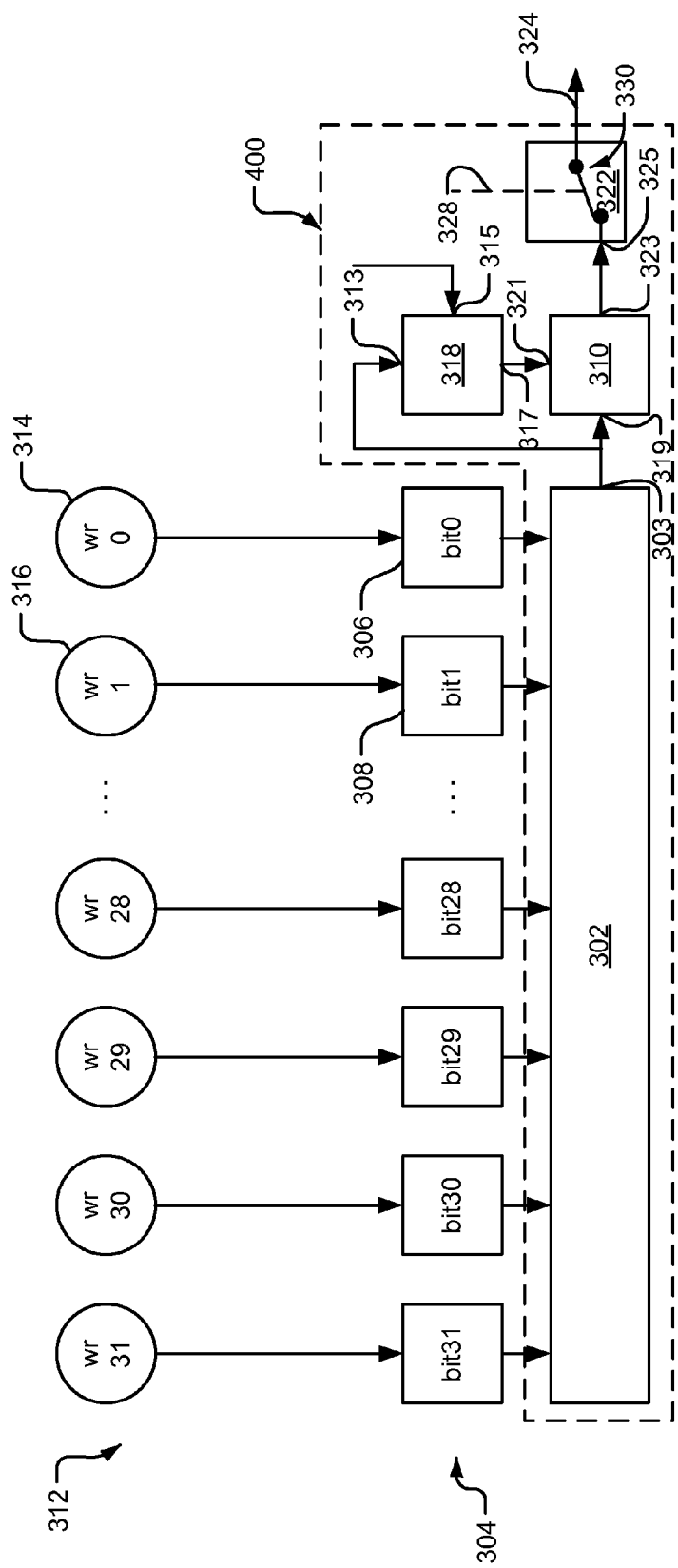
FIG. 4 is a schematic diagram of another example of a part of the integrated circuit(s) of FIG. 1 or FIG. 2 in greater detail and constituting another embodiment of the invention.

Referring to FIG. 4, a simplified version of the protection logic 300 is shown. The simplified protection logic 400 may again comprise the first logic circuitry 302 operably coupled to one or more of the bit stores or flip-flops of the control register 304, for example the first flip-flop 306 and the second flip-flop 308. Of course, the control register is again an example of just one control register and the integrated circuit can comprise more than one control register requiring supervision as described above in relation to FIGS. 1 and 2.

The third logic circuitry 320 of the example of FIG. 3 may not be provided. The programming bus (not shown in FIG. 4) may comprise, in this example, the plurality of write lines 312, respectively coupled to the bit stores of the control register 304, for example the first programming line 314 operably coupled to the first flip-flop 306 and the second programming line 316 operably coupled to the second flip-flop 308. In this example, the first logic circuitry output 303 of the first logic circuitry 302 may also be operably coupled to the first input 313 of the storage unit 318 for storing the reference signature data encoding the reference collective state of the control register 304. The storage unit 318 may also comprise or be coupled to reset logic (not shown) and a reset input 315 may be operably coupled to the reset logic. For example, the storage unit 318 may be a flip-flop having reset logic. The first logic circuitry output 303 of the first logic circuitry 302 may also be operably coupled to the first input 319 of the second logic circuitry 310 and the second input 321 of the second logic circuitry 310 may be operably coupled to the output 317 of the storage unit 318. The output 323 of the third logic circuitry 320 may also be operably coupled to the first input 325 of the alert output logic 322 for providing the alert signal at the alert signal output 324 mentioned above in relation to the previous example. The alert signal logic 322 may also comprise the check enable input 328 operably coupled to the switching logic 330. However, as mentioned above, the skilled person should appreciate that the alert output logic 322 can be implemented in a number of different ways in order to obtain a common functional objective, namely to decouple the output 323 of the first logic circuitry 302 from subsequent circuitry (not shown) provided to respond to an alert signal. This can be achieved, for example using one or more logic gates or a multiplexer.

The first and second logic circuitry 302, 310 may comprise combinatorial logic circuits in order to support functionality, which will also be described later herein. The first and/or second logic circuitry 302, 310 may be hardwired or formed from reprogrammable logic circuitry. However, the reconfigurable logic circuitry may not be reprogrammed on-the-fly, i.e. when in operation. It is important to note this logic is implemented in hardware as opposed to software.

The control register 304 is used in various scenarios, and a number of these scenarios benefit from use of the protection logic 300 or the protection logic 400. For example, taking a single configurable module 104 of the configurable device 200 as an example, the configurable module 104 (of FIG. 2) may only be configured by the content of the control register associated with it, i.e. be unable to modify the first control register 112. In contrast, the MCU 202 may have write-only access to the control register 304, 112 or both read and write access to the control register 304, 112 of the configurable module 104. An example application where the MCU 202 is able to write control data to the control register 304, 112, e.g. the control data is being written by software and accessed by hardware, is the provision of control data by software for further processing by the configurable device 200. It is desirable to protect this type of use of the control register 304, 112.

In another scenario, in addition to the MCU 202 has write-only access to the control register 304, 112 or read and write access to the control register 304, 112, the configurable device 200 may be able to modify the control register 304, 112. In this example, the configurable device 200 is able to be configured by data written by the MCU 202 for control and/or configuration purposes. In such circumstances, the MCU 202 can write data to one or more bits of the control register 304, 112, with the possibility of being able to read one or more data bits back from the control register 304, 112, and the configurable device 200 may also be able both to be configured by data from one or more bits of the control register 304, 112 and modify data in one or more bits of the control register 304, 112. Volatile bits, like so called "action bits" or other self-modifying bits, are an example of where such use of one or more bits of the control register 304, 112 may occur. For example, the MCU 202 may write an action bit to one or more bits of the control register 304, 112 in order to request an action from the configurable device 200 and one or more bits of the control register 304, 112 may be reset by the configurable device 200 once the action has been completed.

It will be appreciated by the skilled person that the above example use cases extend to use of more than one configurable device. In general, the MCU 202 executes software code to read and/or write with respect to the configurable device 200. However, it should be noted that the hardware of the configurable device 200 does not "read" the control register 112 (or other registers 114, 116) per se, because the configurable device 200 is physically connected to the control register 112. Rather, the configurable device 200 can "obtain" data from the control register(s) 112, 114, 116.

Figure 5:
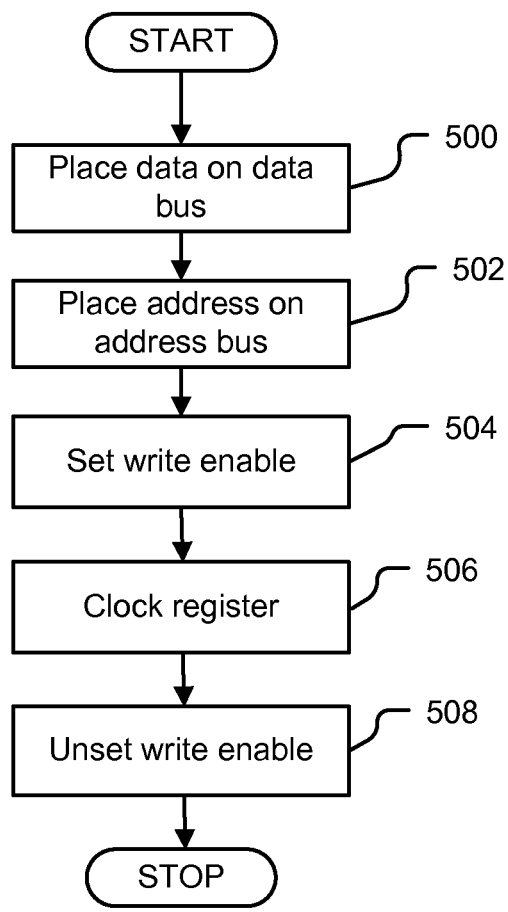
FIG. 5 is a flow diagram of an example of operation of the part of the integrated circuit of FIG. 3 constituting an embodiment of the invention.

Operation of the protection logic 300, 400 of FIGS. 3 and 4 will now be described in the context of the use scenarios set forth above. In operation (FIG. 5), the MCU 202 of FIG. 2 needs to write data to the first control register 112 and so places data on a data bus of the programming buses 212, 204 (Block 500). In relation to FIGS. 2 and 3, the MCU 202 also places the address of the first control register 112 on an address bus of the programming buses 212, 204 (Block 502). Additionally (Block 504), a write enable line is asserted, which is a common technique used to distinguish a read from a write operation. The alert output logic 322 monitors the status of the check enable input 328, which in this example is operably coupled to the write enable signal. When the write enable line is asserted, the alert output logic 322 detects the state of the write enable line at the check enable input 328 thereof and decouples the first input 325 (and hence inhibits the output 323 of the second logic circuitry 310) from the alert signal output 324. This prevents a so-called "false positive" being detected by the alert output logic 322 (and consequential incorrect generation of an alert signal) during a "permitted", e.g., not unexpected, writing of data to the control register 304, 112. In this respect, the change to data stored by the control register 304, 112 is not misinterpreted as an unintended change to the data stored.

Once the write enable line has been asserted, the first control register 304, 112 receives and stores the new value presented at its inputs when the next edge of the clock signal of the integrated circuit occurs (Block 506). Data placed on the data bus is also input into the third logic circuitry 320, which generates reference signature data encoding the reference collective state of the data being written to the first control register 304. Additionally, the data written to the first control register 304, 112 is accessible to the first logic circuitry 302, which uses the written data to generate the actual signature data encoding the actual collective state of the first control register 304, 112. It should be appreciated, though, that in this example the reference signature data is generated prior to generation of the actual signature data. The reference signature data is stored in the storage unit 318 substantially contemporaneously with the input of the new values mentioned above into the control register 304, 112, and the actual signature data is provided to the second logic circuitry 310, which compares the reference signature data stored in the storage unit 318 with the actual signature data obtained via the first logic circuitry 302 in order to determine whether the data stored by the first control register 304, 112 is different to the data that was intended to be written to the first control register 304, 112. However, the alert output logic 322 does not, at this stage, use the output signal at the output 323 of the second logic circuitry 310, because the second logic circuitry 310 has been prevented from providing its output to the alert signal output 324 by the alert output logic 322.

After the data has been written to the first control register 304, 112, the MCU 202 de-asserts the write enable line (Block 508), whereupon the signal at the check enable input 328 of the alert output logic 322 changes and propagation of the result of the supervision of the first control register 304, 112 is re-enabled, because the alert output logic 322 detects that the write enable line is now unset and re-couples the first input 325 thereof so that the output 323 of the second logic circuitry 310 can be monitored for an indication that the actual signature data is different from the reference signature data.

In the event that a bit of the first control register 304, 112 changes, for example, becomes unexpectedly overwritten or randomly changed, the actual signature data generated by the first logic circuitry 302 changes and the second logic circuitry 310, being combinatorial logic, responds to the change to the actual signature data. In this regard, the second logic circuitry 310 employs XOR logic in this example to make the comparison between the signal at the output 303 of the first logic circuitry 302 and the signal at the output 317 of the storage unit 318. If the second logic circuitry 310 detects a difference between the reference signature data and the actual signature data, a change to the actual signature data has been detected and thus a change to one or more bits of the first control register 304, 112. In response to detection of the change to the actual signature data, the second logic circuitry 310 generates a mismatch result at the output 323 of the second logic circuitry 310, which is received at the first input 325 of the alert output logic 322. As the functionality of the second circuitry 310 is instantiated by hardware, the second logic circuitry 310 is able to provide continuous comparison of the actual signature data with the reference signature data.

As mentioned above, the second logic circuitry 310, via the alert output logic 322 in this example, is arranged to initiate an action. The action may be a reprogramming of at least one of the configuration registers 112, 114, 116, for example by the MCU 202, or the issuance of a reset command, for example received at the reset input 315 from the MCU 202 directly or the reset command can be received at the reset input 315 from further reset logic (not shown), external to the configurable device 200 and the MCU 202, the further reset logic being responsive to the alert signal output 324. In the event of the reset instruction being issued, the reset logic of the storage unit 318 (mentioned above) resets the value of the signature data stored to the hardware-coded value in order to ensure that the signature data provided to the second logic circuitry 310 does not result in the second logic circuitry 310 generating an incorrect result after the reset.

The signature data described above can be generated in a number of ways. The actual and/or reference signature data may be encoded in accordance with an error detection only coding scheme. For example, a bit parity error detection scheme may be employed and in this regard XOR logic may be employed to generate a parity bit as an indication of the collective respective states of the data being written to the control register 304, 112 and the data actually stored by the control register 304, 112. If the signature data can be formed from more than one bit, the signature data can be generated using other techniques, for example using a checksum or more than one parity bit technique.

Figure 6:
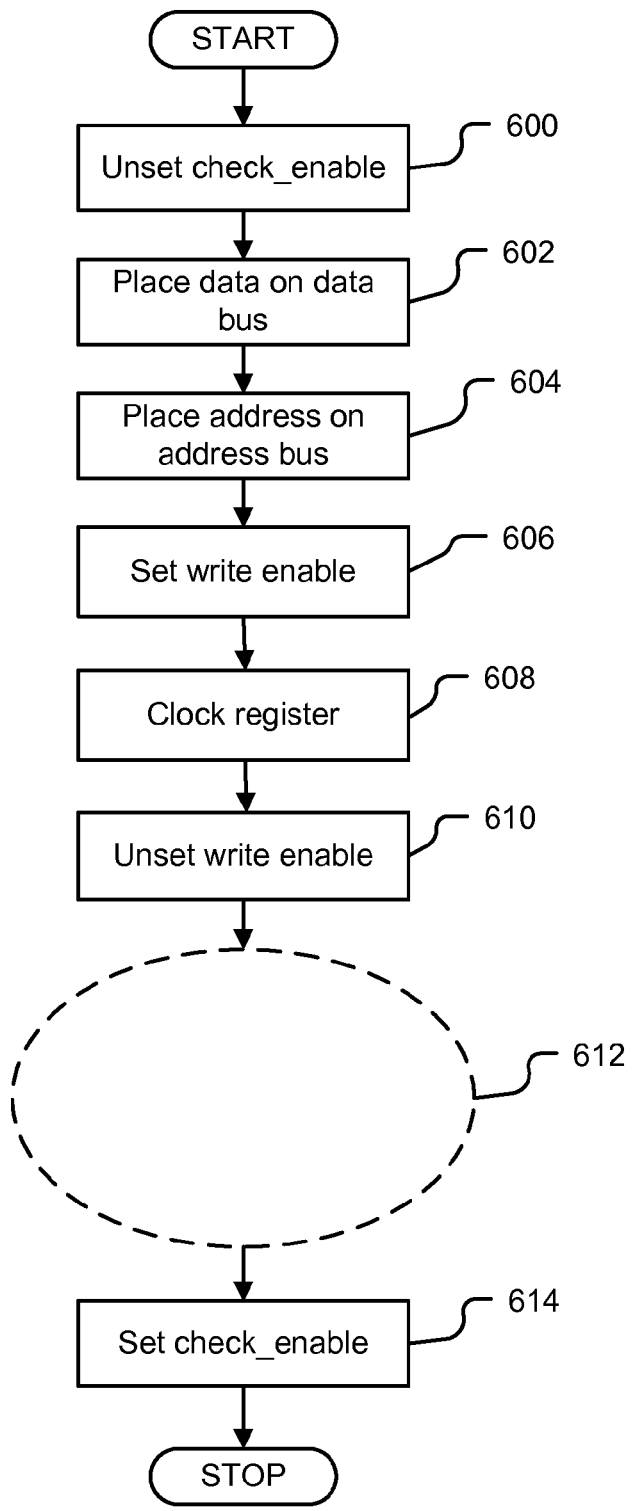
FIG. 6 is a flow diagram of another example of operation of the part of the integrated circuit of FIG. 3 constituting another embodiment of the invention.

Turning to FIG. 6, and employing the integrated circuit of FIG. 3, the MCU 202 of FIG. 2 needs to write data to the first control register 112 but an allowance has to be made for modification of bits by hardware as well as software, for example where action bits need to be set and/or cleared. Consequently, in this example, it is assumed that the configurable device 200 needs to be instructed to perform an action, such as an analogue to digital conversion of a signal (not shown) to which the configurable device 200 has access. This conversion may lead, for example, to a change in the volatile bits of the first control register 112. In such circumstances, the MCU 202 may know during which time windows a change in the volatile bits is expected and/or when a change is not expected.

In this example, a check enable flag is operated independently of the write enable line mentioned above and is also operably coupled to the check enable input 328. The check enable flag is set by software executed by the MCU 202, because the MCU 202 wishes to instruct the configurable device 200 to perform the analogue to digital conversion mentioned above. Of course, in other examples, the check enable flag may be asserted or de-asserted by hardware where hardware needs to modify bits as indicated above.

Prior to initiating writing of data to the first control register 304, 112, the MCU 202 de-asserts the check enable flag (Block 600), which disables supervision of the first control register 304, 112 through the check enable input 328, because the output 323 of the second logic circuitry 310 is not used by the alert output logic 322. When the check enable flag is de-asserted, the alert output logic 322 decouples the first input 325 thereof from the output 323 of the second logic circuitry 310, thereby inhibiting the output 323 of the second logic circuitry 310 from being processed by subsequent circuitry (not shown) provided to respond to an alert signal. This prevents a so-called "false positive" being detected by the alert output logic 322 (and consequential incorrect generation of the alert signal) during a "permitted", e.g., expected, change of data to the control register 304, 112. In this respect, the change to data stored by the control register 304, 112 is not misinterpreted as an unintended change to the data stored.

While propagation of the result of the supervision of the first control register 304, 112 is inhibited, changes to the first control register 304, 112 can be made without triggering the alert signal. In this example, the first control register 304, 112 has action bits that require modification by the configurable device 200. Such modification can take place while the check enable flag is unset. In this example, the MCU 202 places data on the data bus of the programming bus 212, 204 (Block 602) so as to instruct the configurable device 200 to perform the analogue to digital conversion. The MCU 202 also places the address of the first control register 304, 112 holding the relevant action bit(s) on an address bus of the programming buses 212, 204 (Block 604). The data and address used correspond to the action bit(s) that need(s) to be set in order to trigger the analogue to digital conversion. Thereafter (Block 606), the write enable line is set.

Once the write enable bit has been set, the first control register 304, 112 is clocked (Block 608). Data placed on the data bus is also provided to the third logic circuitry 320, which generates reference signature data encoding the reference collective state of the first control register 304, 112. Additionally, the data written to the first control register 304, 112 is accessible to the first logic circuitry 302, which uses the written data to generate the actual signature data encoding the actual collective state of the first control register 304, 112. The reference signature data is clocked into the storage unit 318 and the actual signature data is provided to the second logic circuitry 310, which compares the actual signature data and the reference signature data in order to determine whether the data stored by the first control register 304, 112 is different to the actual data intended to be written to the first control register 304, 112. However, the alert output logic 322 does not, at this stage, propagate the result of the supervision of the first control register 304, 112 while the check enable flag is still unset, even if the reference signature data differs from the actual signature data. Once the first control register 304, 112 has been clocked, the MCU 202 de-assert (Block 610) the write enable bit.

The MCU 202 then waits for an indication, e.g. a signal, that the configurable device 200 has completed the analogue to digital conversion task set. The indication may be as a result of the MCU 202 polling one or more action bits that indicate a status update. For example, the configurable device 200 may, once the analogue to digital conversion (Block 612) has been completed, modify an action bit. Clearly, such a change, if the alert output logic 322 were comparing signatures would trigger an unwanted error alert. However, due to the check enable flag being unset, this does not happen.

Instead, once the relevant bit of the control register 304, 112 has been set by the configurable device 200, the MCU 202 identifies the change to the bit(s) set by the configurable device 200 as a result of the polling process mentioned above. As the MCU 202 now knows that the process of modifying volatile/action bits has been completed, and that thereafter bits are no longer volatile, the MCU 202 asserts the check enable flag (Block 614), whereupon supervision of the first control register 304, 112 is re-enabled, because the alert output logic 322 detects that the check enable flag is now set and allows the output 323 of the second logic circuitry 310 to be monitored for an indication that the actual signature data is different from the reference signature data. As data stored by the control register 304, 112 may have been changed, the MCU 202 may write an updated value to the storage unit 318.

In the event that a bit of the first control register 304, 112 changes, for example, becomes unexpectedly overwritten or randomly changed, the reference signature data generated by the first logic circuitry 302 changes and the change is detected by the second logic circuitry 310. In this respect, if the second logic circuitry 310 detects a difference between the reference signature data and the actual signature data, a change to the actual signature data has been detected and thus a change to one or more bits of the first control register 304, 112. In response to detection of the change to the actual signature data, the second logic circuitry 310 generates the mismatch result at the output 323 of the second logic circuitry 310, which is received at the first input 325 of the alert output logic 322. As the functionality of the second circuitry 310 is instantiated by hardware, the second logic circuitry 310 is able to provide continuous comparison of the actual signature data with the reference signature data.

As mentioned above, the second logic circuitry 310, via the alert output logic 322 in this example, is arranged to initiate an action. The action may be a reprogramming of at least one of the configuration registers 112, 114, 116, for example by the MCU 202, or the issuance of a reset command as mentioned above in relation to a previous example, which may result in a reset signal being received at the reset input 315. In the event of the reset instruction being issued, the reset of the storage unit 318 (mentioned above) resets the value of the signature data stored to the hardware-coded value in order to ensure that the signature data provided to the second logic circuitry 310 does not result in the second circuitry 310 incorrectly generating the alert signal immediately after the reset.

Figure 7:
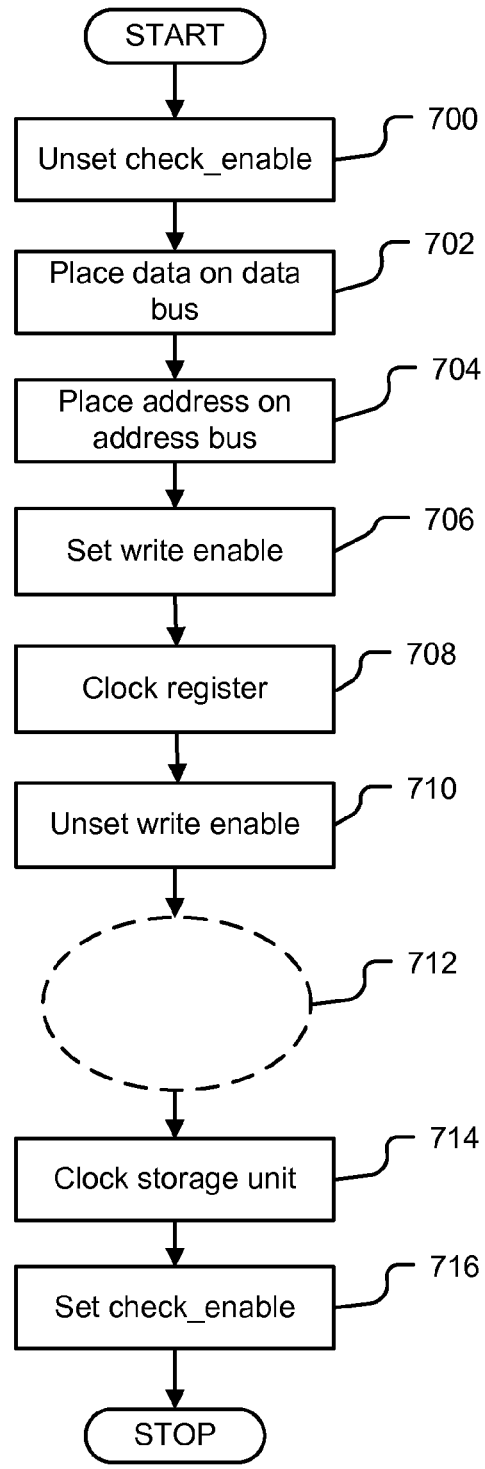
FIG. 7 is a flow diagram of an example of operation of the part of the integrated circuit of FIG. 4 constituting a further embodiment of the invention.

Referring to FIG. 7, in another example employing the integrated circuit of FIG. 4, the MCU 202 of FIG. 2 needs to write data to the first control register 304, 112 but an allowance has to be made for modification of bits by hardware as well as software, for example where action bits need to be set and/or cleared. This is an example of a so-called volatile bit, which is modified by software to obtain a desired response from the configurable device 200 and then the configurable device 200 is provided with an opportunity to set the or another action bit once the configurable device 200 has performed the operation requested by the MCU 202 by virtue of setting the action bit. Consequently, in this example, it is assumed that the configurable device 200 needs to be instructed to perform an action, such as an analogue to digital conversation of a signal (not shown) to which the configurable device 200 has access.

In this example, a check enable flag is also operated independently of the write enable line mentioned above. The check enable flag is asserted by software executed by the MCU 202, because the MCU 202 wishes to instruct the configurable device 200 to perform the analogue to digital conversion mentioned above. As such, prior to initiating writing of data to the first control register 304, 112, the MCU 202 de-asserts the check enable flag (Block 700), which inhibits propagation, to the alert signal output 324, of the result of the supervision of the first control register 304, 112. When the check enable flag is unset, the alert output logic 322 decouples the first input 325 thereof from the alert signal output 324, thereby inhibiting the output 323 of the second logic circuitry 310 from being processed by subsequent circuitry (not shown) provided to respond to the alert signal. This prevents a so-called "false positive" being detected by the alert output logic 322 (and consequential incorrect generation of the alert signal) during a "permitted", e.g., not unexpected, writing of data to the control register 304, 112. In this respect, the change to data stored by the control register 304, 112 is not misinterpreted as an unintended change to the data stored.

While supervision of the first control register 304, 112 is disabled, changes to the first control register 304, 112 can be made without triggering the alert signal. In this example, the first control register 304, 112 has action bits that require modification by the configurable device 200. Such modification can take place while the check enable flag is unset. In this example, the MCU 202 places data on the data bus of the programming buses 212, 204 (Block 702) so as to instruct the first configurable module 104 to perform the analogue to digital conversion. The MCU 202 also places the address of the first control register 304, 112 holding the relevant action bit(s) on an address bus of the programming buses 212, 204 110 (Block 704). The data and address used correspond to the action bit(s) that need(s) to be set in order to trigger the analogue to digital conversion. Thereafter (Block 706), the write enable line is set.

Once the write enable line has been set, the first control register 304, 112 is clocked (Block 708). The data written to the first control register 304, 112 is accessible to the first logic circuitry 302, which uses the written data to generate the reference signature data encoding the reference collective state of the first control register 304, 112.

The reference signature data, in this example, also serves as the actual signature data encoding the actual collective state of the first control register 304, 112 and is consequently stored in the storage unit 318. The reference signature data is available to the second logic circuitry 310, which compares the actual signature data and the reference signature data in order to determine whether the data stored by the first control register 304, 112 is different to the actual data initially written to the first control register 304, 112. However, the alert output logic 322 does not, at this stage, propagate the result of the supervision of the first control register 304, 112 while the check enable flag is still unset, even if the reference signature data differs from the actual signature data. Once the first control register 304, 112 has been clocked, the MCU 202 de-asserts (Block 710) the write enable line.

The MCU 202 then waits for an indication that, either by polling or by a hardware signal, the configurable device 200 has completed the analogue to digital conversion task set. The indication may be as a result of the MCU 202 polling one or more action bits that provide a status update indication. For example, the first configurable module 104 may, once the analogue to digital conversion (Block 712) has been completed, write an action bit. Clearly, such a change, if the alert output logic 322 were comparing signatures would trigger an unwanted error alert. However, due to the check enable flag being unset, this does not happen.

Instead, once the relevant bit of the control register 304, 112 has been set by the configurable device 200, the MCU 202 identifies the change to the bit set by the first configurable module 104 as a result of the polling process mentioned above. As the MCU 202 now knows that the process of modifying action bits has been completed, the storage unit 318 is clocked to obtain and store the signature data generated by the first logic circuitry 302 (Block 714). The MCU 202 then asserts the check enable flag (Block 716), whereupon propagation of the result of the supervision of the first control register 304, 112 is re-enabled, because the alert output logic 322 detects that the check enable flag is now set and the output 323 of the second logic circuitry 310 can be monitored by the subsequent circuitry (not shown) for an indication that the actual signature data is different from the reference signature data.

In the event that a bit of the first control register changes, for example, becomes unexpectedly overwritten or randomly changed, the reference signature data generated by the first control logic 302 changes and the change is detected by the second logic circuitry 310. In this respect, if the second logic circuitry 310 detects a difference between the reference signature data and the actual signature data, a change to the actual signature data has been detected and thus a change to one or more bits of the first control register 304, 112. In response to detection of the change to the actual signature data, the second logic circuitry 310 generates an alert signal at the output 323 of the second logic circuitry 310, which is received at the first input 325 of the alert output logic 322. As the functionality of the second circuitry 310 is instantiated by hardware, the second logic circuitry 310 is able to provide continuous comparison of the actual signature data with the reference signature data.

As mentioned above, the second logic circuitry 310, via the alert output logic 322 in this example, is arranged to initiate an action. The action may be a reprogramming of at least one of the configuration registers 112, 114, 116, for example by the MCU 202, or the issuance of a reset command as mentioned above in relation to a previous example, which may result in the reset signal being received at the reset input 315. In the event of the reset command being issued, the reset of the storage unit 318 (mentioned above) resets the value of the signature data stored to the hardware-coded value, or in this example, the reset value can be provided by clocking the first logic circuiting output 303 of the first logic circuitry 302, in order to ensure that the signature data provided to the second logic circuitry 310 does not result in the second circuitry 310 incorrectly generating the alert signal immediately after the reset.

In the foregoing specification, the invention has been described with reference to specific examples of embodiments of the invention. It will, however, be evident that various modifications and changes may be made therein without departing from the broader spirit and scope of the invention as set forth in the appended claims.

For example, although the above examples have been described in the context of the CPU/configurable device implementation of FIG. 2, the skilled person should appreciate that the implementation can be performed in respect of the microcontroller circuit of FIG. 1.

The examples described above in relation to FIGS. 6 and 7 employ temporal suspension of supervision of the state of the control registers 112, 114, 116 in order to allow for use of self-modifying bits, for example action bits, whilst avoiding undesirable false triggering of the alert signal. However, in other embodiments the first logic circuitry 302, and where provided, the third logic circuitry 320 may be configured so as to exclude specifically bits of one or more control register, known to be used as self-modifying bits, from calculation of the reference signature data and the actual signature data.

The supervision provided by the protection logic 300, 400 permits updating of the reference signature data stored by the storage unit 318 and as generated by the first logic circuitry 302 or the third logic circuitry 320 in response to detection of a write access to one or more of the control registers 112, 114, 116 in order to accommodate correct supervision of the control registers 112, 114, 116 when it is necessary to update data stored by one or more of the registers.

Some of the above embodiments, as applicable, may be implemented using a variety of different architectures for integrated circuits. For example, although FIGS. 1 and 2 and the discussions thereof describe an exemplary architecture, this architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, those skilled in the art will recognize that boundaries between the functionality of the above described operations are merely illustrative. The functionality of logic blocks may be combined into a single logic block, and/or the functionality of a single logic block may be distributed amongst multiple logic blocks.

Other modifications, variations and alternatives of the embodiments set forth herein are also possible. The specification and drawings are, accordingly, to be regarded in an illustrative rather than in a restrictive sense.

For example, although the first logic circuitry output 303, the third logic circuitry output 311, the first input 313, the output 317, the storage unit 318, the first output 319, and the second input 321 described in the examples above are one bit wide, the skilled person should appreciate that the width of one or more of these can be more than one bit wide, depending upon the desired implementation of the protection logic 300, In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:
1. An integrated circuit comprising:
a write bus operably coupled to a register for storing control data;
a storage unit arranged to store reference signature data encoding a reference collective state of the register;
first logic circuitry arranged to generate actual signature data encoding the actual collective state of the register;
second logic circuitry operably coupled to the storage unit and arranged to receive the actual signature data and compare the actual signature data with the reference signature data stored by the storage unit; and
an alert inhibitor; wherein
the second logic circuitry comprises an alert output to provide thereat an alert signal in response to the comparison identifying a difference between the actual signature data and the reference signature data, thereby ensuring detection of a data integrity error in respect of the register; and
the alert inhibitor comprises a control input, the alert inhibitor being responsive to the control input and arranged to inhibit selectively onward propagation of the alert signal from the alert output.
2. A circuit as claimed in claim 1, further comprising:
third logic circuitry hardwired to encode the reference signature data in response to and based upon a number of data bits to be written to the register.
3. A circuit as claimed in claim 2, wherein:
the write bus comprises a plurality of data lines respectively coupled at one end thereof to bits of the register; and
the third logic circuitry is operably coupled to the plurality of data lines in order to receive the data bits to be written to the register.
4. A circuit as claimed in claim 2, wherein the third logic circuitry is arranged to generate the reference signature data prior to generation of the actual signature data.
5. A circuit as claimed in claim 1, wherein the first logic circuitry is hardwired to encode the actual signature data using data bits stored in the register.
6. A circuit as claimed in claim 5, wherein the first logic circuitry is operably coupled to the storage unit arranged to generate the reference signature data using a number of the data bits stored in the register, the reference signature data generated by the first logic circuitry being stored by the storage unit in response to writing the control data to the register.
7. A circuit as claimed in claim 1, wherein the first logic circuitry is arranged to encode the actual signature data in accordance with an error detection coding scheme.
8. A circuit as claimed in claim 7, wherein the third logic circuitry is arranged to encode the reference signature data in accordance with a same error detection coding scheme as employed by the first logic circuitry.
9. A circuit as claimed in claim 1, wherein the first logic circuitry is arranged to encode the actual signature data in accordance with a bit parity error detection scheme.
10. A circuit as claimed in claim 1, wherein the second logic circuitry is triggered by a change to the received actual signature data.
11. A circuit as claimed in claim 1, further comprising:
a monitoring unit operably coupled to the alert output; wherein
the monitoring unit is arranged to initiate an action in response to detection of the alert signal.
12. A circuit as claimed in claim 11, wherein the action is a reprogramming of the register or issuance of a reset command.
13. A circuit as claimed in claim 1, wherein the storage unit comprises reset logic circuitry arranged to set the storage unit to store a predetermined reset value in response to receipt of a reset command, the predetermined reset value is dependent upon a reset state of the register.
14. A circuit as claimed in claim 1, wherein the storage unit is arranged to be updated with updated reference signature data in response to detection of a write access to the register.
15. A circuit as claimed in claim 14, wherein the write access is detected by the first logic circuitry, the first logic circuitry being arranged to update the content of the storage unit with updated reference signature data in response to the detection of the write access.
16. A circuit as claimed in claim 1, wherein the register comprises a volatile bit, and the first logic circuitry is arranged to exclude the value of the volatile bit when generating the actual signature data.
17. A circuit as claimed in claim 16, wherein the first logic circuitry is arranged to exclude the value of the volatile bit by temporally suspending calculating the actual signature data.
18. A method of detecting a data integrity error in respect of a register in an integrated circuit coupled to a write bus, the method comprising:
encoding a reference collective state of the register as reference signature data and storing the reference signature data;
generating actual signature data encoding the actual collective state of the register;
comparing the actual signature data with the reference signature data stored by the storage unit;
generating an alert signal in response to the comparison identifying a difference between the actual signature data and the reference signature data, thereby ensuring detection of a data integrity error in respect of the register; and
selectively inhibiting onward propagation of the alert signal in response to a control input signal for inhibiting use of the alert signal.

* * * * *